United States Patent
Liu et al.

(10) Patent No.: US 7,908,884 B2
(45) Date of Patent: Mar. 22, 2011

(54) METHOD FOR BONDING TWO PLATES

(75) Inventors: Chien-Kuo Liu, Miaoli (TW); Tung-Yuan Yung, Bade (TW); Kin-Fu Lin, Taipei (TW); Szu-Han Wu, Taoyuan (TW)

(73) Assignee: Atomic Energy Council-Institute of Nuclear Energy Research, Taoyuan County (TW)

( * ) Notice: Subject to any disclaimer, the term of this patent is extended or adjusted under 35 U.S.C. 154(b) by 121 days.

(21) Appl. No.: 12/010,405

(22) Filed: Jan. 24, 2008

(65) Prior Publication Data
US 2010/0180636 A1    Jul. 22, 2010

(51) Int. Cl.
C03C 27/00    (2006.01)
C03C 27/06    (2006.01)
C03C 27/10    (2006.01)

(52) U.S. Cl. .............................. 65/33.5; 65/36
(58) Field of Classification Search .................. 65/33.5; 29/428, 450; 156/60
See application file for complete search history.

(56) References Cited

U.S. PATENT DOCUMENTS

| | | | | |
|---|---|---|---|---|
| 4,130,408 A | * | 12/1978 | Crossland et al. | 65/43 |
| 5,167,687 A | * | 12/1992 | Muragishi et al. | 65/33.5 |
| 5,914,562 A | * | 6/1999 | Khan et al. | 313/582 |
| 7,074,294 B2 | * | 7/2006 | Dubrow | 156/276 |

* cited by examiner

*Primary Examiner* — Matthew J Daniels
*Assistant Examiner* — Cynthia Szewczyk
(74) *Attorney, Agent, or Firm* — Jackson IPG PLLC; Demian K. Jackson

(57) ABSTRACT

Three bonding materials are provided on a first plate. The first bonding material is located between the second and third bonding materials. The first bonding material is thicker than the other bonding materials. A second plate is provided on the first bonding material. All of the plates and the bonding materials are heated to the softening point of the first bonding material. A load is exerted on the first bonding material to reduce the thickness of the first bonding material to that of the second and third bonding materials and transfer the load to the second and third bonding materials from the first bonding material. The temperature is raised to and kept at the crystallization point of the first bonding material. The temperature is raised to the wetting point of the second and third bonding materials.

10 Claims, 4 Drawing Sheets

METHOD FOR BONDING TWO PLATES

BACKGROUND OF INVENTION

1. Field of Invention

The present invention relates to a method for bonding two ceramic or glass-ceramic plates and, more particularly, to a method for bonding two ceramic or glass-ceramic plates by two glass or glass-ceramic bonding materials of different thermal properties.

2. Related Prior Art

Glass is used to bond many materials such as metal, alloy, ceramic and crystallized glass. Glass is most often used to bond glass to metal.

To bond glass to metal, the glass is heated so that its interface with the metal is adequately wet. Then, the glass and the metal are cooled to the room temperature, and bonded together.

There are various types of glass and metal. To bond glass and metal together firmly, their thermal properties must be considered. The thermal coefficient of the glass must be matched with that the metal. Otherwise, there would be stress in the glass and the metal, and the bond would be broken if the stress exceeds a limit of strength of the glass.

Sometimes, it is intended to bond two plates together by glass while leaving a gap between them. The materials of the plates and the type of the glass must be carefully selected for the above-mentioned reasons. A spacer is often used to make the gap. It is however troublesome to use such a spacer.

The present invention is therefore intended to obviate or at least alleviate the problems encountered in prior art.

SUMMARY OF INVENTION

It is the primary objective of the present invention to provide a method for bonding two plates together firmly.

According to the present invention, the method includes the step of providing three bonding materials on the first plate so that the first bonding material is located between the second and third bonding materials. The first bonding material is thicker than the second and third bonding materials. The second plate is provided on the first bonding material. The first and second plates and the first, second and third bonding materials are heated to the softening point of the first bonding material. A load is exerted on the first bonding material to reduce the thickness of the first bonding material to that of the second and third bonding materials and transfer the load to the second and third bonding materials from the first bonding material. The temperature is raised to and kept at the crystallization point of the first bonding material. The temperature is raised to the wetting point of the second and third bonding materials so that the interface between the first plate and the first, second and third bonding materials and the interface between the second plate and the first, second and third bonding materials are wet. The first, second and third bonding materials will firmly bond the first and second plates together when they cool down.

Other objectives, advantages and features of the present invention will become apparent from the following description referring to the attached drawings.

BRIEF DESCRIPTION OF DRAWINGS

The present invention will be described through the detailed illustration of the preferred embodiment referring to the drawings.

DETAILED DESCRIPTION OF PREFERRED EMBODIMENT

Figure 1:
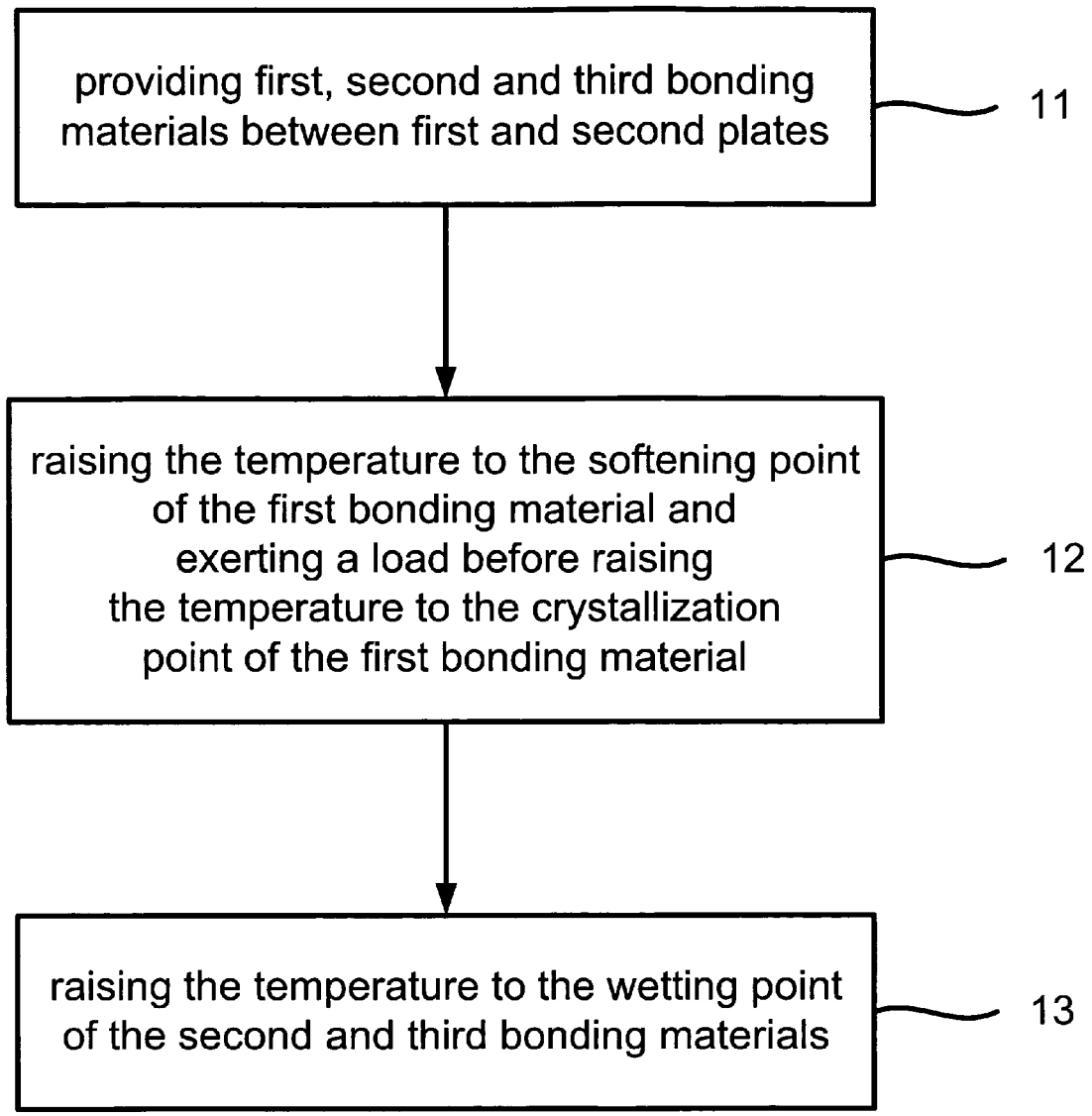
FIG. 1 is a flowchart of a method for bonding two plates according to the preferred embodiment of the present invention.

Referring to FIG. 1, there is shown a method for bonding two plates according to the preferred embodiment of the present invention.

Figure 2:
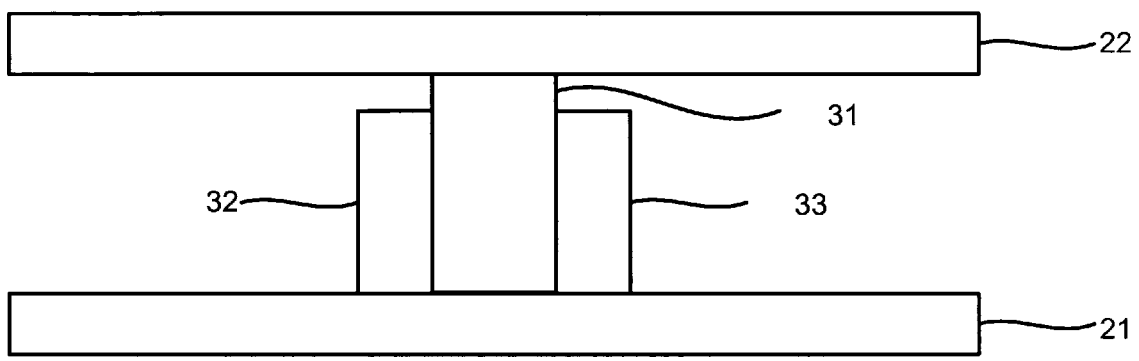
FIG. 2 is a side view of two plates and three bonding materials used in the method shown in FIG. 1.

Referring to FIG. 1, at step 11, a first plate 21 is provided (as shown in FIG. 2). The first plate 21 is made of metal or ceramic.

A first bonding material 31, a second bonding material 32 and a third bonding material 33 are provided on the first plate 21. The first bonding material 31 is located between the second bonding material 32 and the third bonding material 33. The first bonding material 31 is thicker than the second bonding material 32 and the third bonding material 33. The thickness of the second bonding material 32 is preferably identical to the thickness of the third bonding material 33.

The first bonding material 31 is glass or glass-ceramic including 0 to 40 mol % of silicon dioxide, 0 to 20 mol % of boron oxide, 0 to 20 mol % of aluminum oxide, 0 to 40 mol % of barium oxide, 0 to 10 mol % of calcium oxide and 0 to 10 mol % of titanium oxide for example. The softening point of the first bonding material 31 is 690 degrees Celsius, and the crystallization point is 710 degrees Celsius.

The second bonding material 32 and the third bonding material 33 are preferably identical. The second bonding material 32 and the third bonding material 33 are glass or glass-ceramic including 0 to 40 mol % of silicon dioxide, 0 to 10 mol % of aluminum oxide, 0 to 40 mol % of barium oxide, 0 to 20 mol % of calcium oxide and 0 to 5 mol % of zirconium dioxide for example. The softening point of the bonding materials 32 and 33 is 710 degrees Celsius. The crystallization point of the bonding materials 32 and 33 is preferably 900 degrees Celsius, higher than that of the first bonding material 31. Alternatively, the bonding materials 32 and 33 cannot be crystallized at all. The melting point of the second and third bonding materials is lower than that of the first bonding material.

A second plate 22 is provided on the first bonding material 31. There is a gap between the second plate 22 and the second bonding material 32 or the third bonding material 33 since the first bonding material 31 is thicker than the second bonding material 32 and the third bonding material 33.

Figure 3:
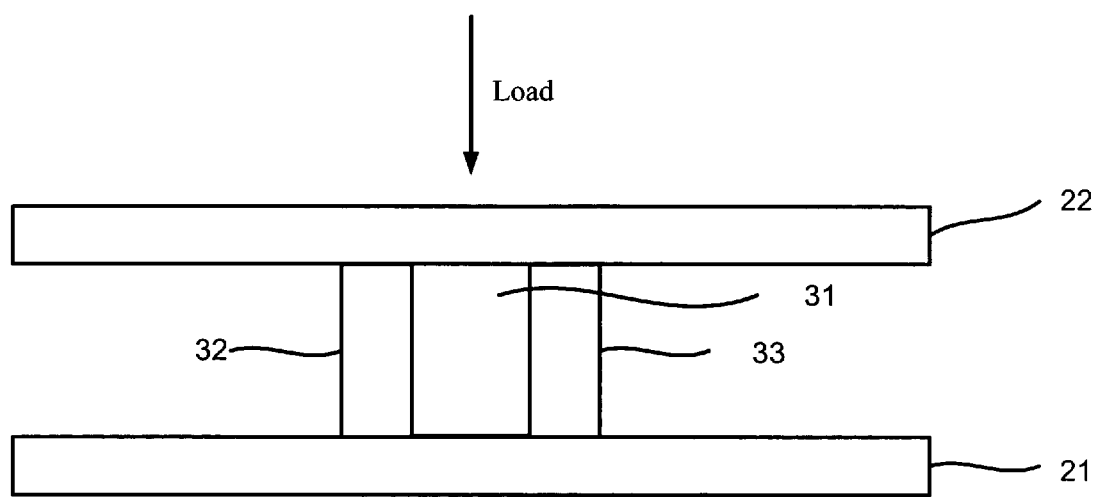
FIG. 3 is a side view of the plates and the bonding materials in another position than shown in FIG. 2.

Referring to FIGS. 1 and 3, at 12, the plates 21 and 22 and the bonding materials 31, 32 and 33 are heated. When the temperature reaches 690 degrees Celsius, a load is exerted on the second plate 22 and to the first bonding material 31 so that the thickness of the first bonding material 31 is reduced to that of the second bonding materials 32 and 33. The bonding materials 31 and 32 remain solid because the temperature is lower than 710 degrees Celsius, the softening point thereof. Hence, the load is transferred from the first bonding material 31 to the second bonding materials 32 and 33.

The temperature is raised to and remained at 700 degrees Celsius, the crystallization point of the first bonding material 31. The first bonding material 31 is crystallized. On the other hand, the bonding materials 32 and 33 are softened. Therefore, the load is transferred back to the first bonding material 31 from the bonding materials 32 and 33.

Figure 4:
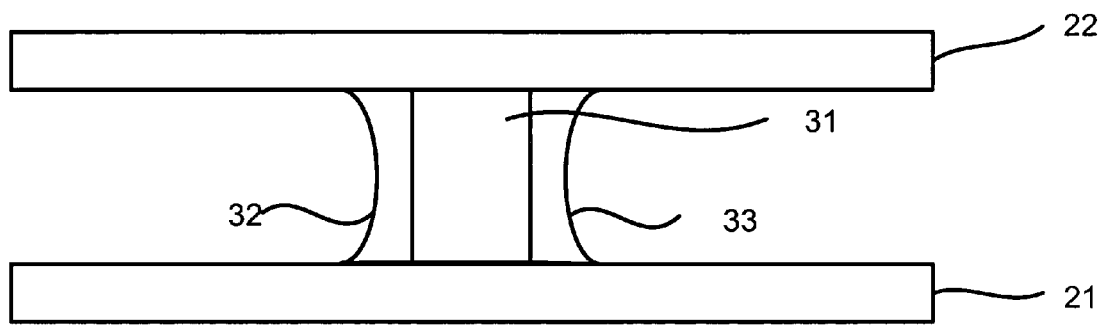
FIG. 4 is a side view of the plates and the bonding materials in another position than shown in FIG. 3.

Referring to FIGS. 1 and 4, at 13, the temperature is raised to the wetting point of the bonding materials 32 and 33 so that the interface between the first plate 21 and the bonding materials 31, 32 and 33 and the interface between the second plate 22 and the bonding materials 31, 32 and 33 are wet. The bond will completed when they cool down.

The method of the present invention exhibits several advantages. Firstly, the bond of the plates 21 and 22 by the bonding materials 31, 32 and 33 is firm. Secondly, due to the different thermal properties of the bonding materials 31, 32 and 33, a desired distance is defined between the plates 21 and 22 without the need for an additional spacer.

The present invention has been described through the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A method for bonding a first plate to a second plate comprising the steps of:
   providing a first bonding material, a second bonding material and a third bonding material on the first plate so that the first bonding material is located between the second and third bonding materials, wherein the first bonding material is thicker than the second and third bonding materials;
   providing the second plate on the first bonding material;
   heating the first and second plates and the first, second and third bonding materials to the softening point of the first bonding material;
   exerting a load on the first bonding material to reduce the thickness of the first bonding material to that of the second and third bonding materials and transfer the load to the second and third bonding materials from the first bonding material;
   raising the temperature to the crystallization point of the first bonding material and keeping the temperature at the crystallization point of the first bonding material; and
   raising the temperature to the wetting point of the second and third bonding materials to wet the interface between the first plate and the first, second and third bonding materials and the interface between the second plate and the first, second and third bonding materials so that the first, second and third bonding materials will firmly bond the first and second plates together when they cool down,
   wherein the melting point of the first bonding material is higher than that of the second and third bonding materials.

2. The method according to claim 1, wherein the first plate is made of a material selected from a group consisting of metal and ceramic.

3. The method according to claim 1, wherein the second plate is made of a material selected from a group consisting of metal and ceramic.

4. The method according to claim 1, wherein the first bonding material is selected from a group consisting of glass and glass-ceramic.

5. The method according to claim 4, wherein the first bonding material comprises 0 to 40 mol % of silicon dioxide, 0 to 20 mol % of boron oxide, 0 to 20 mol % of aluminum oxide, 0 to 40 mol % of barium oxide, 0 to 10 mol % of calcium oxide and 0 to 10 mol % of titanium oxide for example.

6. The method according to claim 1, wherein the second and third bonding materials are selected from a group consisting of glass and glass-ceramic.

7. The method according to claim 6, wherein the second and third bonding materials comprise 0 to 40 mol % of silicon dioxide, 0 to 10 mol % of aluminum oxide, 0 to 40 mol % of barium oxide, 0 to 20 mol % of calcium oxide and 0 to 5 mol % of zirconium dioxide.

8. The method according to claim 1, wherein the crystallization point of the second and third bonding materials is higher than that of the first bonding material.

9. The method according to claim 1, wherein the thickness of the second and third bonding materials is the gap between the first and second plates after the bond.

10. The method according to claim 1, wherein the load is returned to the first bonding material from the second and third bonding materials when the temperature is kept at the crystallization point of the first bonding material.

\* \* \* \* \*